Sept. 12, 1967   B. A. THOMAS   3,340,657
DOOR CONSTRUCTION FOR GLASSHOUSES
Filed June 18, 1962

INVENTOR
BASIL ARNOLD THOMAS
BY
Woodhams, Blanchard and Flynn
ATTORNEYS

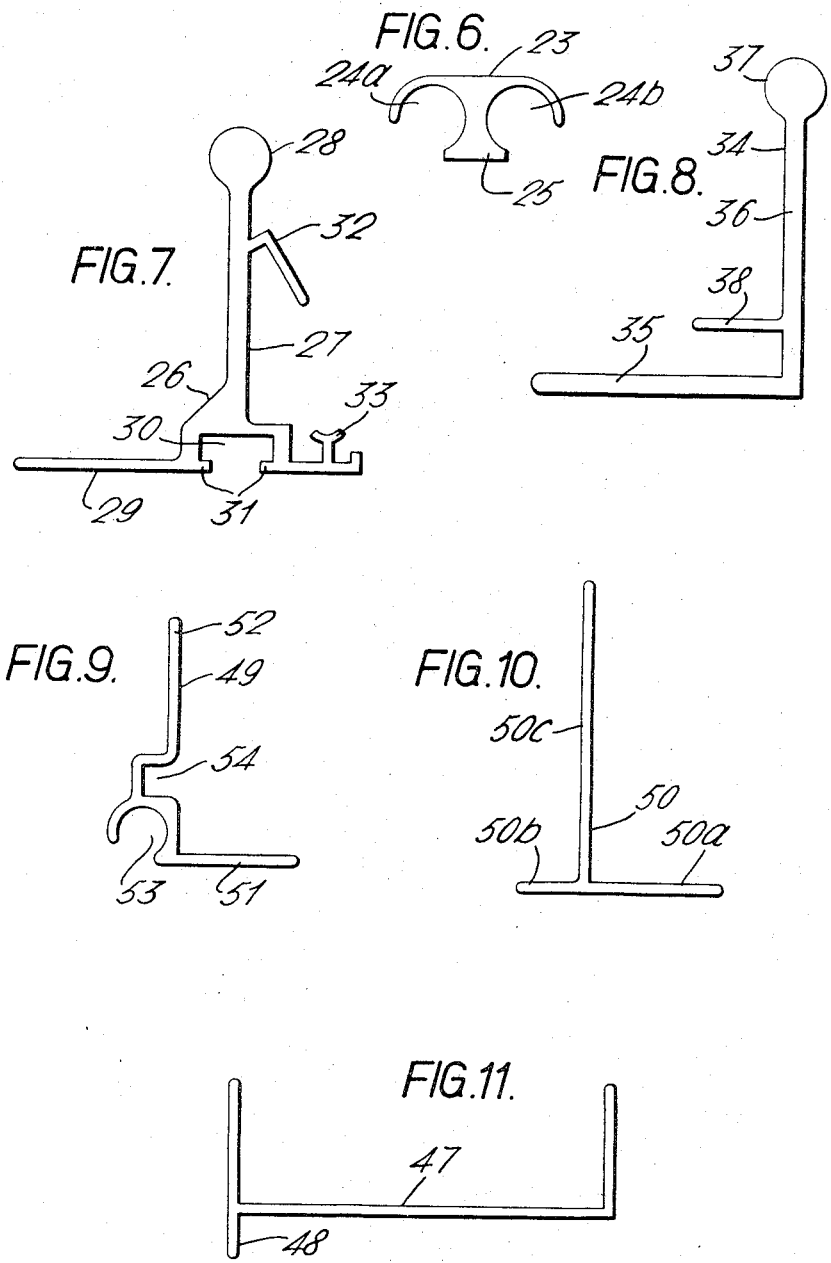

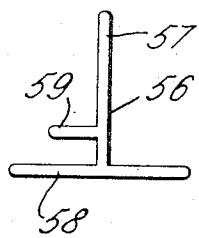
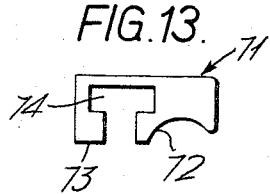
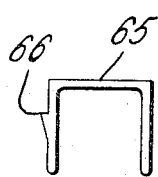
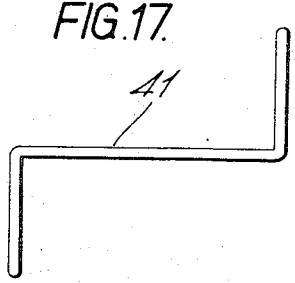

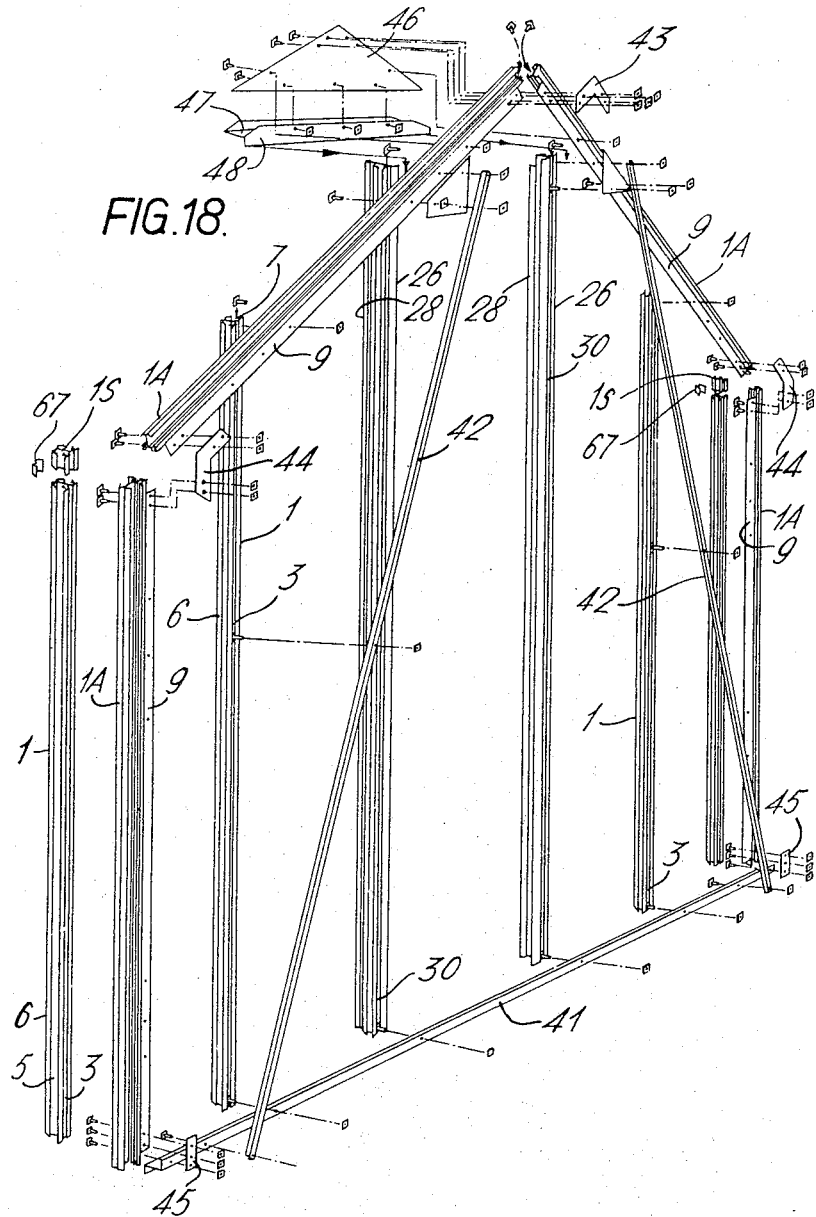

Sept. 12, 1967 B. A. THOMAS 3,340,657
DOOR CONSTRUCTION FOR GLASSHOUSES
Filed June 18, 1962 11 Sheets-Sheet 5

INVENTOR
BASIL ARNOLD THOMAS
BY
Woodhams, Blanchard and Flynn
ATTORNEYS

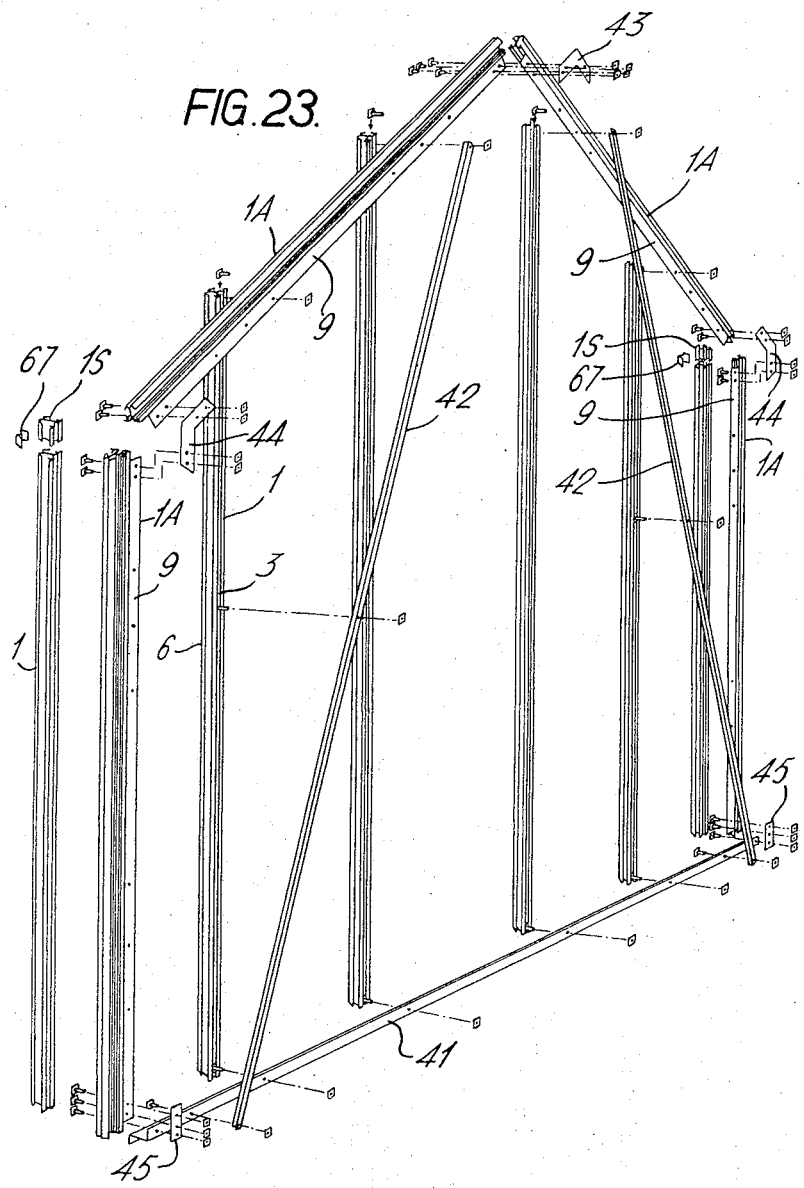

Sept. 12, 1967   B. A. THOMAS   3,340,657
DOOR CONSTRUCTION FOR GLASSHOUSES
Filed June 18, 1962   11 Sheets-Sheet 7
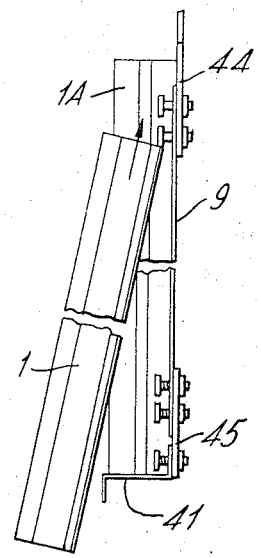
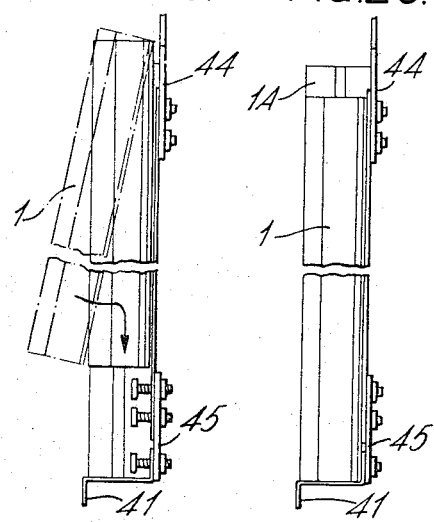
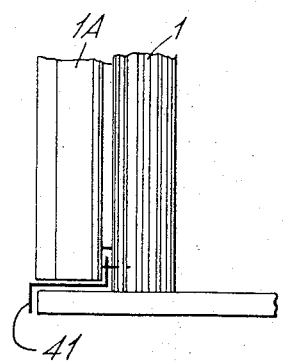
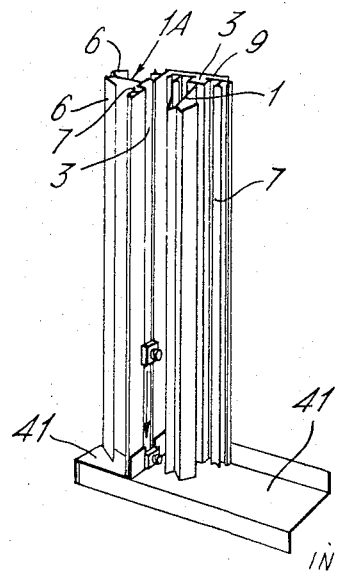
INVENTOR
BASIL ARNOLD THOMAS
BY
Woodhams, Blanchard & Flynn
ATTORNEYS

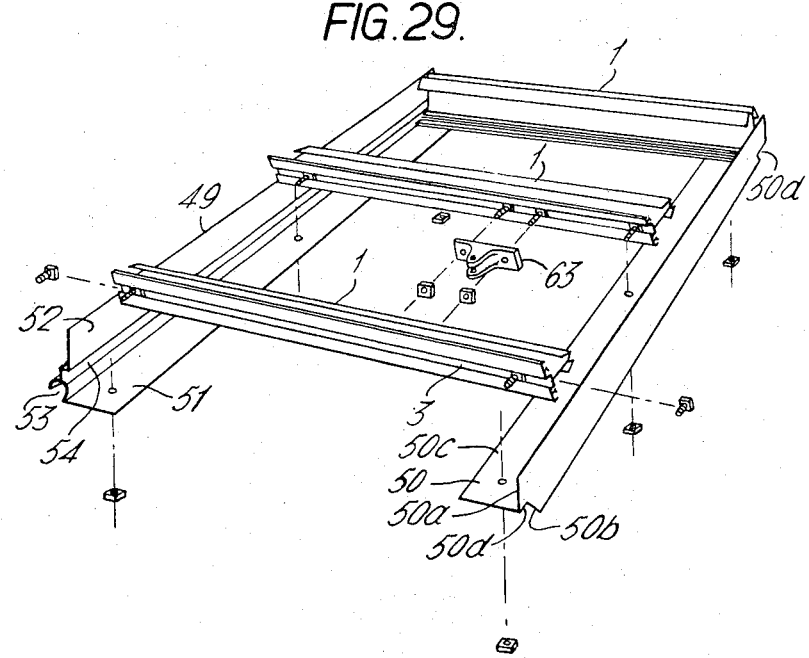
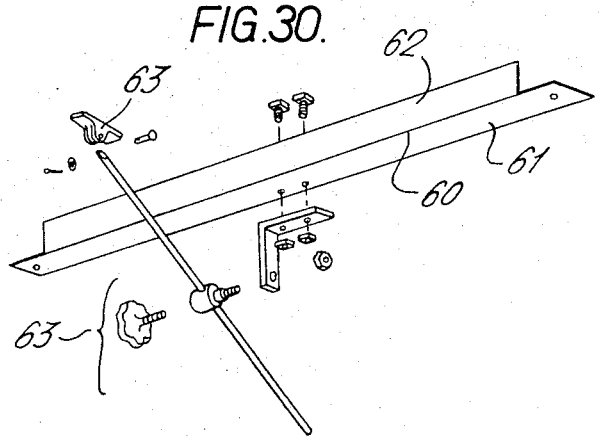

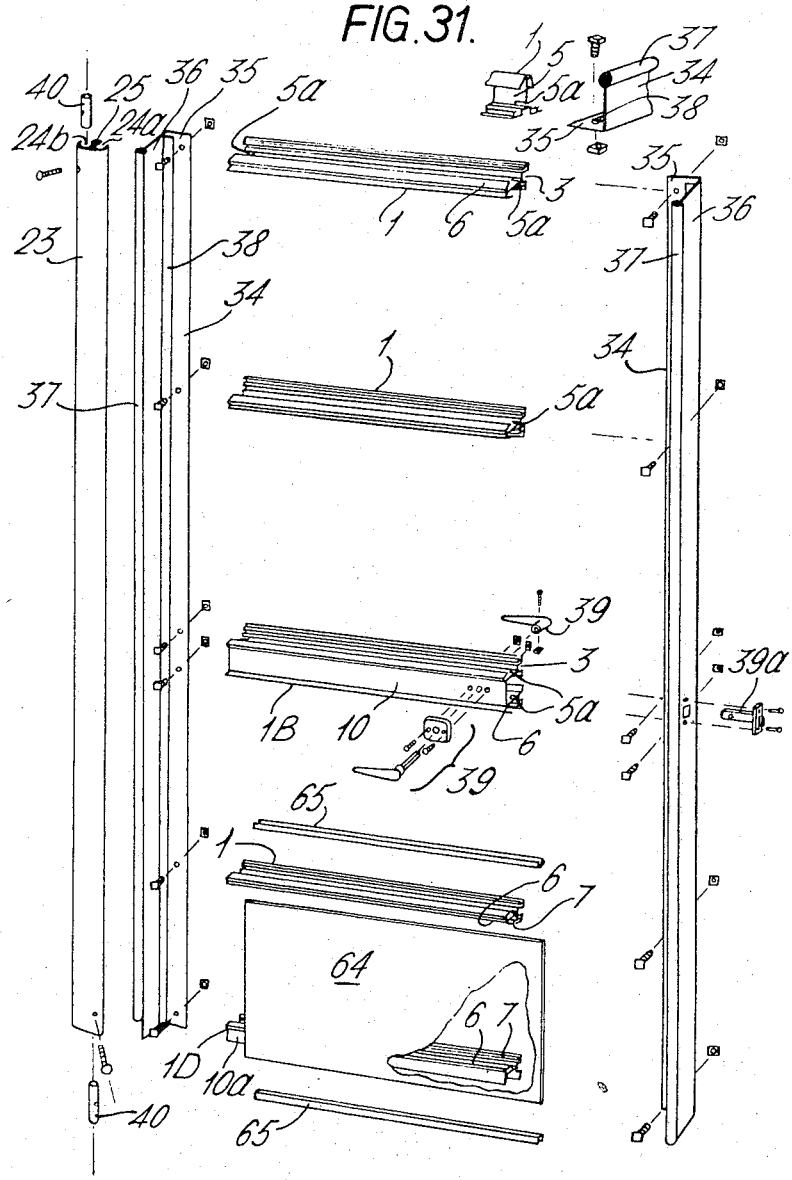

Sept. 12, 1967   B. A. THOMAS   3,340,657
DOOR CONSTRUCTION FOR GLASSHOUSES
Filed June 18, 1962   11 Sheets-Sheet 10
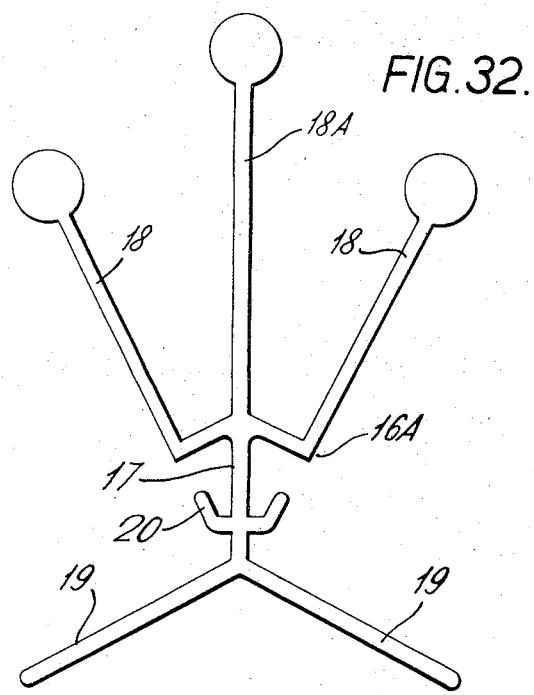
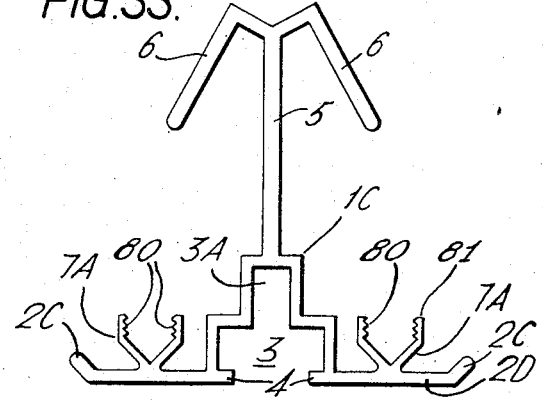
INVENTOR
BASIL ARNOLD THOMAS
BY
Woodhams, Blanchard & Flynn
ATTORNEYS

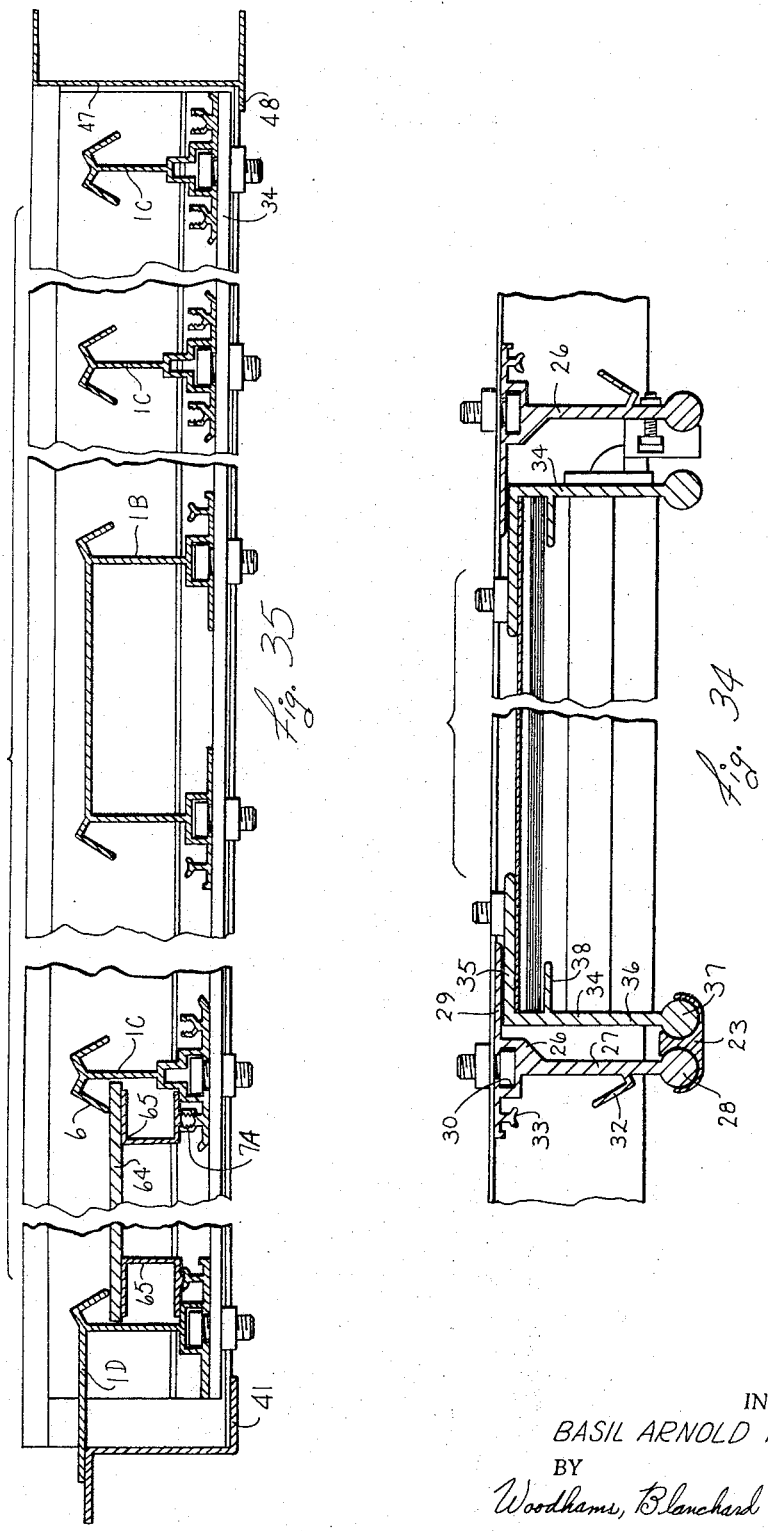

United States Patent Office 3,340,657
Patented Sept. 12, 1967

3,340,657
DOOR CONSTRUCTION FOR GLASSHOUSES
Basil Arnold Thomas, Cambridge, England; Barclays Bank Limited, 54 Lombard St., London, E.C. 3, England, executor of said Basil A. Thomas, deceased
Filed June 18, 1962, Ser. No. 203,257
Claims priority, application Great Britain, June 19, 1961, 22,107/61
5 Claims. (Cl. 52—210)

The invention relates to doorways for glasshouses.

It is an object of the invention to provide a doorway for a glasshouse which is so constructed that it may be readily put together by a purchaser from prefabricated parts.

According to the inevntion, a doorway for a glasshouse is provided with substantially all of its structural parts, including glazing bars or rails, of extruded members of a corrosion-resistant metal, for example, aluminum or an aluminum alloy. The members are provided so that they may be readily locked together, as by nuts and bolts, the main structural parts being advantageously interlocked by or through gusset plates. The gusset plates, nuts, bolts and washers may be substantially the only non-extruded parts in the doorway. The gusset plates may, for example, be of stainless steel.

According to the invention furthermore, the doorway includes a door hinge having two grooves of parti-cylindrical section which extend the whole length of the hinge. The door and door post each include a member which is adapted to be received by a sliding motion in one of the parti-cylindrical grooves of the hinge. Stops are provided for mounting in the hinge or on the door and door post to locate the hinge on the door post and the door in the hinge.

According to the invention moreover, the glasshouse may comprise a roof-ridge member having a central web provided symmetrically on each of its two sides with a lower platform on which glazing bars rest, an upper wing having a parti-cylindrical member extending along its length and a seating member for glass, the seating member being disposed between the platform and wing. The upper glass panes of the roof rest on the seating member which is in the form of a tray or is provided with a groove, to receive a sealing substance.

According to the invention furthermore, the glasshouse is provided with an eaves gutter having in its underside a longitudinal groove to receive the upper ends of the upper run of glass panes in the side wall of the glasshouse.

The glasshouse is provided with one or more roof ventilators which are opened and closed by pivotal movement about the parti-cylindrical member provided on the roof-ridge member.

The several parts of the doorway are preferably provided in such manner that it may be readily sealed to provide a house which is substantially air-tight.

One construction according to the invention is diagrammatically illustrated by way of example in the accompanying drawings, in which FIGURE 1 is an end view of a glazing bar;

FIGURE 6 is an end view of a door hinge;

FIGURE 7 is an end view of a vertical door jamb or post;

FIGURE 8 is an end view of a vertical member of the door;

FIGURES 9 to 10 are end views of the hinge and bottom members respectively of a ventilator;

FIGURE 11 is an end view of a lintel;

FIGURE 12 is an end view of a shut or slam rail;

FIGURE 13 is an end view of the member for the door-keep;

FIGURE 14 is an end view of a retaining member;

FIGURE 15 is an end view of a cross-tie or strut;

FIGURE 16 is an end view of a stop;

FIGURE 17 is an end view of a base member;

FIGURE 18 is an exploded view, from the inside of the house, of the structural members which form that end of the glasshouse in which the door is provided;

FIGURE 23 is an exploded view of members at the end of the glasshouse other than that shown in FIGURE 18;

FIGURES 24, 25 and 26 show one glazing bar being fitted on to another at a corner of the glasshouse;

FIGURE 27 is a side view of the corner structure of the glasshouse;

FIGURE 28 is a perspective view corresponding to FIGURE 27;

FIGURE 29 is an exploded view of the members of a roof ventilator;

FIGURE 30 is an exploded view of means for holding a roof ventilator open;

FIGURE 31 is an exploded view of the door of the glasshouse;

FIGURE 32 is an end view of a modified roof-ridge member, and

FIGURE 33 is an end view of a further construction of glazing bar.

FIGURE 34 shows a broken, horizontal, sectional view of a door embodying the invention.

FIGURE 35 shows a broken, vertical, setcional view of the door appearing in FIGURE 34.

Figure 1:
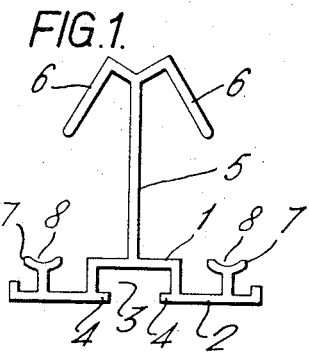

The glazing bar 1 (FIGURE 1) comprises a base 2 having in its undersurface a central longitudinal recess 3 provided with lips 4, into which recess the polygonal head of a bolt can be slid from one end of the glazing bar with the shank of the bolt extending outwardly between the lips 4. A nut can then be readily threaded on the bolt as the head of the bolt is prevented from turning. On its upper or outer surface the glazing bar 1 has a central web 5 at the outer end of which are provided two angular members 6 for retaining glazing clips. A seating member 7 for glass is provided on each side of the central web 5, each seating member having a shallow groove 8 at its head on which a strip of sealing substance may be disposed both to form an air-tight seal and to provide a soft bed or cushion for the glass. Such sealing is preferably a non-hardenable substance of putty-like consistency.

Figure 2:
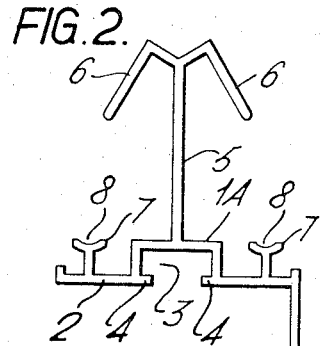
FIGURES 2 and 3 are end views of two modified glazing bars.

The modified glazing bar 1A (FIGURE 2) is similar to the glazing bar 1 but is provided with a wall 9 which depends from one edge of the base 2. The depending wall 9 is provided with holes or slots to receive the shanks of bolts by means of which the glazing bar is secured to other glazing bars, gusset plates or other members. This modified glazing bar is adapted for use at the four corners of the glasshouse; it is also used at the two ends of the roof.

The modified glazing bar 1B (FIGURE 3) virtually consists of a pair of the glazing bars 1 interconnected by a transverse web 10. This modified glazing bar 1B is used on the door of the glasshouse. It will be noted that both of the bases 2B of the glazing bar 1B have only one seating member 7 and groove 8.

The modified glazing bar 1C (FIGURE 33) is generally similar to the glazing bar 1 but differs from it mainly in two features, namely in the seating members for the glass panes and in the longitudinal recess provided in the undersurface of the base 2D. The seating members 7A are substantially of U-shape in cross-section and are provided with ribs 80 on the inner surfaces of their upstanding walls, the ribs 80 extending longitudinally of the glazing bar and being disposed adjacent to the lips 81 of the members 7A. Each seating member is adapted to retain in position a resilient sealing member, for example, of rubber or of a resilient synthetic resin such as plasticized polyvinyl chloride, by engagement between the ribs 80 and the sealing member. The sealing member will extend above the level of the lips 81 and will support the glass panes. The sealing member may be formed with side flanges adapted to bear on and extend over the lips 81. Such sealing members may be readily produced by an extrusion process.

The recess 3 of the modified glazing bar 1C opens into a central, subsidiary recess 3A. The nut of a bolt may be slid into the recess 3 and the bolt may then be threaded into the nut, the shank of the bolt being received in the subsidiary recess 3A.

The two longitudinal edges of the base 2D of the modified glazing bar 1C are upturned to provide flanges 2C, the angle between the upper surface of the base 2D and the inner surface of each flange 2C being preferably greater than 90°.

Figure 4:
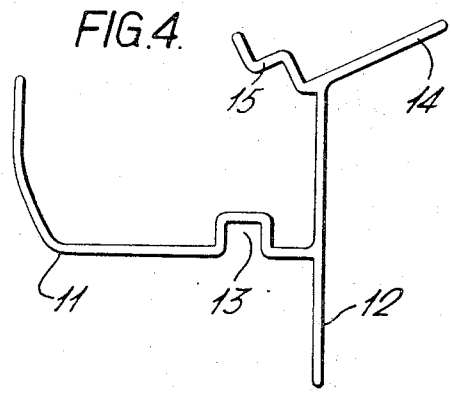
FIGURE 4 is an end view of an eaves gutter.
Figure 19:
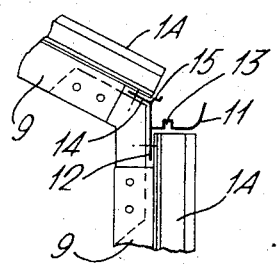
FIGURE 19 is a section through the eaves of the glasshouse.
Figure 20:
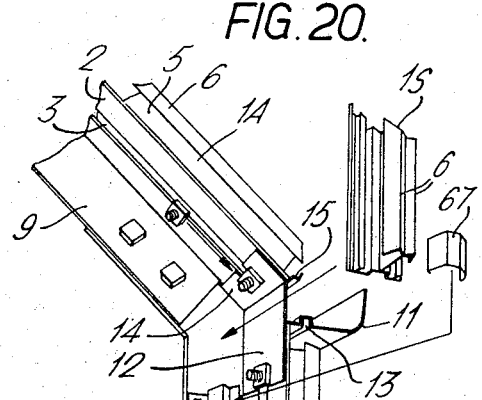
FIGURE 20 is a perspective view of the eaves.

The eaves gutter 11 (FIGURES 4, 19 and 20) has a depending side wall 12 on which bear the upper ends of the glazing bars in the vertical side wall of the glasshouse and to which the glazing bars are secured by bolts. A longitudinal groove 13 in the underside of the gutter receives the upper ends of the uppermost panes of glass of the side wall of glasshouse, the side edges of the glass panes resting on the seating members 7 of the glazing bars 1. The longitudinal groove 13 preferably contains a sealing substance, of the kind hereinbefore referred to, into which the upper edges of top panes of glass are pressed. Alternatively, a moulding of a relatively soft, resilient substance, such as plasticised polyvinyl chloride, may be mounted over the upper edge of the panes of glass. In such case, the head of the moulding may advantageously be of bulbous form to be a push-fit into the groove 13.

At its upper end the gutter 11 is provided with a platform 14 on which the lower portions of the glazing bars of the roof rest and to which they are secured by bolts. The lower ends of the lower run of glass panes in the roof rest on a sealing substance provided on a ledge 15.

Figure 5:
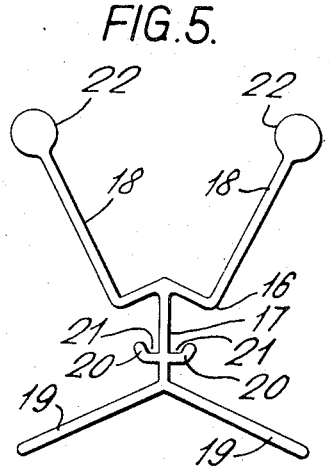
FIGURE 5 is an end view of a roof-ridge member.
Figure 21:
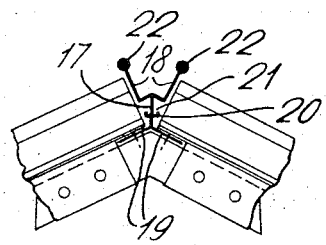
FIGURE 21 is an end view of the ridge of the glasshouse.
Figure 22:
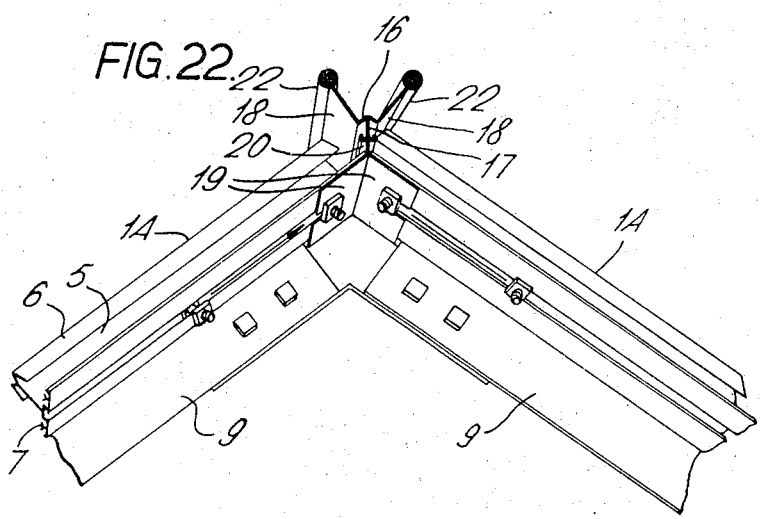
FIGURE 22 is a perspective view corresponding to FIGURE 21.

The roof-ridge member 16 (FIGURES 5, 21 and 22) comprises a central web 17 having two wing members 18 at its head, two platforms 19 at its foot and two seating members 20 at an intermediate position. The upper ends of the glazing bars of the roof rest on and are secured to the platforms 19 and the upper edges of the two upper runs of glass panes rest on a sealing substance contained in grooves or depressions 21 in the seating members 20. The outer ends 22 of the wings 18 are parti-cylindrical in form and function as pivotal axes or hinge members for roof ventilators.

The modified roof-ridge member 16A (FIGURE 32) differs from the roof-ridge member 16 (FIGURE 5) in that it is provided with a strengthening member 18A intermediate the two wing members 18, the member 18A being virtually an extension of the central web 17.

The hinge member 23 (FIGURES 6, 31 and 34) has two similar, parti-cylindrical recesses 24a and 24b extending along its length and separated by a web 25. A part of a vertical side member of a door is received in the recess 24a and a part of a vertical member of a door frame is received in the recess 24b, as hereinafter described.

The vertical side-members 26 (FIGURES 7, 18 and 34) of the door frame also function as glazing bars and comprise a web 27 the outer end 28 of which is parti-cylindrical in form, a base 29 in which is provided a recess 30 having lips 31, an angular member 32 on one side of the web and a seating member 33 for glass. The recess 30, lips 31, angular member 32 and seating member 33 are similar in form and serve the same purposes as the corresponding members 3, 4, 6 and 7 of the glazing bar 1.

The vertical side members 34 (FIGURES 8, 31, 34 and 35) of the door are generally of L-shape with a base 35 and an upstanding arm 36 the outer end 37 of which is parti-cylindrical in form. A platform 38 extends from the arm 36, the platform being parallel and adjacent to the base 35. The two side members 34 of the door are interconnected by glazing bars 1, the bases 2 of the glazing bars resting on the bases 35 and being secured to them by bolts, the platforms 38 being received in slots 5a cut out of the webs 5 of the glazing bars.

Figure 3:
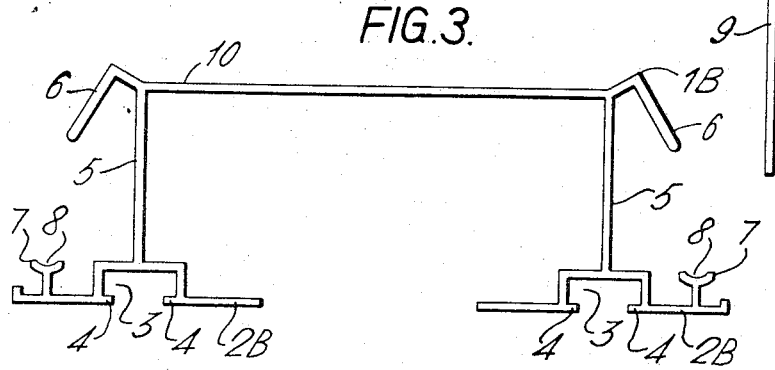

At a position intermediate of their length, the side members 36 are similarly interconnected by the modified glazing bar 1B (FIGURE 3). Locking means 39 and 39a are mounted on the transverse web 10 and between the webs 5 of the glazing bar 1B.

The lowermost glazing bar 1D in the door is similar to the modified glazing bar 1B (FIGURE 3) and, in effect, can be made by cutting the transverse web 10 between the two webs 5. The glazing bar 1D thus has a depending skirt 10a which is in close contact with the base member 41 when the door is closed. The lowermost panel of the door is provided as a metal plate 64, preferably of an aluminum alloy, which is held tightly in contact with the edge of the angular member 6 on each of the lowermost glazing bar 1 and glazing bar 1D by means of two retaining members 65 (FIGURE 14 and 31). The retaining members 65 are a close fit between the back of the plate 64 and the seating members 7 of the two glazing bars, each retaining member 65 having a longitudinal projection 66 which tends to bite into the plate 64 and assists in keeping it in position.

The dimensions of the parti-cylindrical members 28 and 37 on the door post 26 and door frame 34 respectively are such that they can only be engaged in and separated from the parti-cylindrical grooves 24a and 24b of the hinge member 23 by a relative longitudinal movement of the parts. A cylindrical stop 40 is held in position by a bolt at one end of the groove 24a and another stop 40 is similiarly held in position at the remote end of groove 24b. The hinge member 23 is moved down over one of the door frame members 26 so that the parti-cylindrical member 28 is received in the groove 24b, until the stop 40 in the groove 24b rests on the member 28. The parti-cylindrical member 37 of appropriate side member 34 of the door is then slid into the groove 24a of the hinge member 23 until member 37 rests on the stop 40 located at the bottom of the groove 24a. The door may then be opened and closed, the door itself being pivotable through an angle about the hinge member 23 and the hinge member 23 itself being similarly pivotable on the door post 26.

A door catch 71 (FIGURE 13) is mountable upon the door frame member 26 which is not hinged to the door. The catch 71 has a groove 72 for receiving a portion of the member 28 of the door frame member and its wall portion 73 is adapted to lie against the leftward side of the web 27 as appearing in FIGURE 7. It is secured to the web 27 by bolts (not shown) which pass through the web and are threaded into nuts (not shown) which are disposed in the recesses 74.

The two glazing bars at each end of the roof are the modified glazing bars 1A (FIGURES 2, 18 and 23) to the depending walls 9 of which the upper ends of the vertical glazing bars 1 in the ends of the glasshouse are secured by bolts. The upper ends of the door posts 26 are similarly secured. The lower ends of these vertical members, as well as the lower ends of glazing bars in the side walls of the glasshouse, are secured by bolts to a base member 41 (FIGURES 17, 18 and 23) which approximates in cross-section to a Z. The end glazing bars 1A of the roof are also secured to the base member 41 by ties or struts 42 (FIGURES 15, 18 and 23), each strut 42 being also bolted to at least one of the vertically disposed glazing bars 1. Struts 42 also extend in a similar manner between each eaves gutter 11 and the base member 41 disposed below it.

The two pairs of glazing bars 1A at the ends of the roof are secured together by a gusset plate 43 and are secured to the upper ends of the glazing bars 1A at the corners of the glasshouse by gusset plates 44, the lower ends of the corner glazing bars 1A being secured to the base member 41 by gusset plates 45. The adjacent ends of the glazing bars 1A at the end of the roof adjacent to the door, are also secured together by a further gusset plate 46 (FIGURE 18) to which is secured the lintel or top member 47 (FIGURES 11, 18 and 35) of the door frame. The member 47 has a depending wall 48 against which the upper transverse glazing bar 1 in the door bears when the door is in the closed position.

The glazing bar 1 secured to the wall 9 of each of glazing bars 1A at the four corners of the house, is conveniently of a length shorter than that required to extend up to the superjacent glazing bar 1A at the end of the roof. Each of the four glazing bars 1 is extended by a short length 1s of glazing bar of the same cross-section, to the glazing bar 1A of the roof, the pair of glazing bars 1 and 1s being united by a clip 67 which engages over the angular members 6 (FIGURES 18, 20 and 23) of the two glazing bars.

One or more ventilators are provided in the roof. Each ventilator comprises a hinge member 49 and a sill member 50 (FIGURES 9, 10 and 29) interconnected by glazing bars 1. The hinge member 49 comprises a base 51 to which the glazing bars are secured, an upstanding wall 52 and a parti-cylindrical recess 53. A groove 54 is provided in the wall 52, in which groove the upper ends of the top panes of glass of the ventilator are received and bedded on a sealing substance. Holes or slots are advantageously provided in the wall 50a of the sill member 50 to permit rain to flow off. Similar holes or slots may also be provided in the groove 54 of the hinge member 49.

The ventilator is mounted on the roof-ridge member 16 by engaging the parti-cylindrical member 22 of the roof-ridge in the parti-cylindrical recess 53 of the ventilator on to the member 22. A stop 55 (FIGURE 16) is also slid on to the parti-cylindrical member 22 on each side of the hinge member 49. A locking screw (not shown) is provided in each stop 55 to engage the parti-cylindrical member 22 to lock the stop on the member 22, so preventing the ventilator from being displaced longitudinally along the member 22.

In the closed position of the ventilator, the undersurface of the member 50c of the sill member 50 rests on the head of a web or wall 57 of a shut or slam rail 56 (FIGURE 12) which also includes a base 58 and a platform 59. The slam rail 56 is mounted on seating members 7 of two adjacent glazing bars 1 in the roof, the two ends of the wall 57 of the slam rail being cut away to accommodate the adjacent angular members 6 of the two glazing bars. The upper edge of the pane of glass in the run immediately below the ventilator extends into the gap between the platform 59 and base 58 of the slam rail and bears against the wall 57.

The base 58 of the slam rail bears at its end remote from the platform 59, against the limb 62 of an angle-piece 60 which is secured by bolts through its other limb 61 to the two glazing bars 1 in the roof on which the adjacent slam rail rests. When the ventilator is in the closed position, the cut away portion 50d of the wall 50b of the sill member 50 coincides with the wings of the angular members 6 of the two adjacent glazing bars 1.

Means 63 are provided on the angle-piece 60 and the ventilator for holding the ventilator in an open position.

It will be understood that, where necessary, the panes of glass will rest on a bed of sealing substance. Furthermore, the heads of the slam rails which bear against the sill members of the ventilators will be provided with a resilient cover or sheath, for example, of plasticized polyvinyl chloride, to provide a seal.

The invention provides a doorway structure for a glasshouse in which the structural members are all substantially of metal, which can be produced relatively cheaply and which can readily be put together by unskilled labour.

I claim:

1. A door construction comprising:

a pair of spaced-apart elongated vertical posts defining the sides of a door opening, said posts having substantially parallel first flanges which extend transversely inwardly in the same direction away from the general plane of said door opening;

a door mounted between said posts and having a pair of substantially L-shaped vertical side members disposed adjacent said posts, said side members having substantially parallel arms which extend transversely inwardly in the same direction away from the general plane of said door and which are substantially parallel with said first flanges, said side members having bases which extend toward each other in the general plane of said door, said door having a plurality of substantially horizontally extending vertically spaced-apart glazing bars extending between and secured to said side members, said glazing bars having bases whose ends are overlapped with and are secured to the bases of said side members, said glazing bars having horizontal webs extending transversely inwardly away from said glazing bar bases and retaining members extending from said glazing bar webs partway back toward said glazing bar bases, said retaining members terminating in substantially the same vertical plane;

closure panels extending between adjacent glazing bars and being disposed at their upper and lower edges between the ends of said retaining members and said glazing bar bases;

the flange on one of said door posts and the arm of the door side member adjacent thereto having enlarged partially cylindrical inner ends which are disposed in side-by-side relation; and an elongated hinge member having two vertical grooves of partially cylindrical cross section formed therein, said grooves being positioned in side-by-side relation and opening the same direction, said enlarged inner ends being rceived into and retained within said grooves so that the door can pivot with respect to said one post.

2. A door construction according to claim 1, in which said glazing bars each have a longitudinally extending recess which opens through a slot of reduced width in the base thereof, bolts extending through said bases of said side members and threadedly engaged with nuts disposed in the recesses in said glazing bars for securing said glazing bars to said side members.

3. A door construction according to claim 2, in which one of said glazing bars has two horizontal spaced-apart webs which are connected by a plate-like member, said one glazing bar having two longitudinally extending recesses for receiving bolts and each web having a retaining member extending therefrom, and a latch structure mounted in said one glazing bar between the webs thereof and adapted for cooperation with a latch element on the other vertical post.

4. A door construction according to claim 3, in which said glazing bar bases have seating members projecting therefrom toward the ends of said retaining members and being spaced therefrom, said closure panels being received between said retaining members and said seating members.

5. A door construction according to claim 4, in which the seating member is concave in transverse section and is adapted to receive a sealing member.

References Cited
UNITED STATES PATENTS

| | | | |
|---|---|---|---|
| 1,171,444 | 2/1916 | Larson et al. | 52—456 |
| 1,461,538 | 7/1923 | McKenzie | 52—90 |
| 1,536,977 | 5/1925 | Skipworth | 52—90 |
| 1,672,418 | 6/1928 | Lehman | 160—235 |
| 1,911,732 | 5/1933 | Walker | 52—278 |
| 2,200,706 | 4/1950 | Slater | 52—90 |
| 2,642,018 | 6/1953 | Weeber | 160—235 |
| 2,685,851 | 8/1954 | Zachman | 52—278 |
| 2,706,543 | 4/1955 | Kammerer | 52—455 X |
| 2,801,601 | 8/1957 | Riedel | 52—11 |
| 2,803,321 | 8/1957 | Fox-Williams | 52—464 |
| 2,838,148 | 6/1958 | Fox-Williams et al. | 52—502 |
| 3,002,592 | 10/1961 | Quinn | 49—399 |
| 3,053,353 | 9/1962 | Miller | 52—456 X |
| 3,057,117 | 10/1962 | Singer | 52—11 |
| 3,083,798 | 4/1963 | Sklar | 49—400 |

FOREIGN PATENTS 1,046,295  12/1958  Germany.

EARL J. WITMER, *Primary Examiner*.